Patented Mar. 29, 1927.

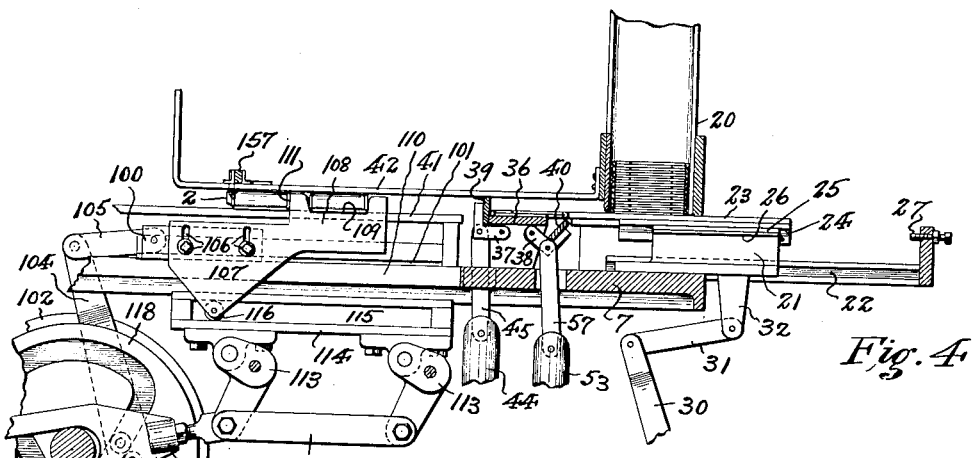

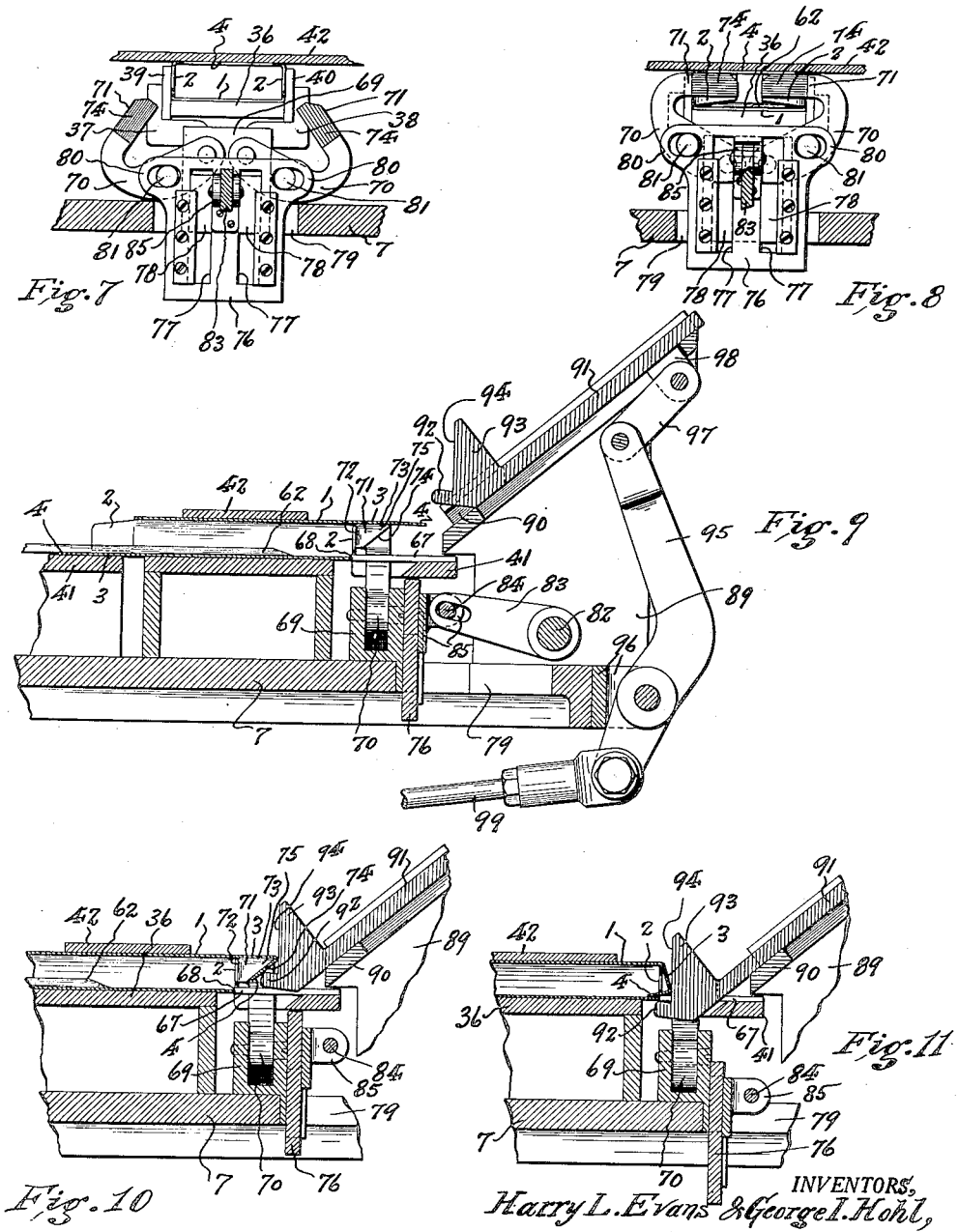

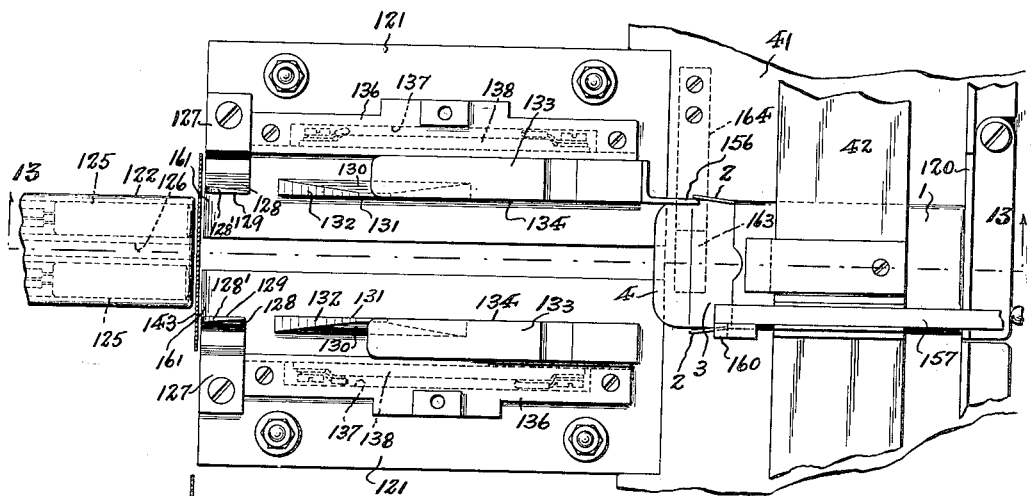
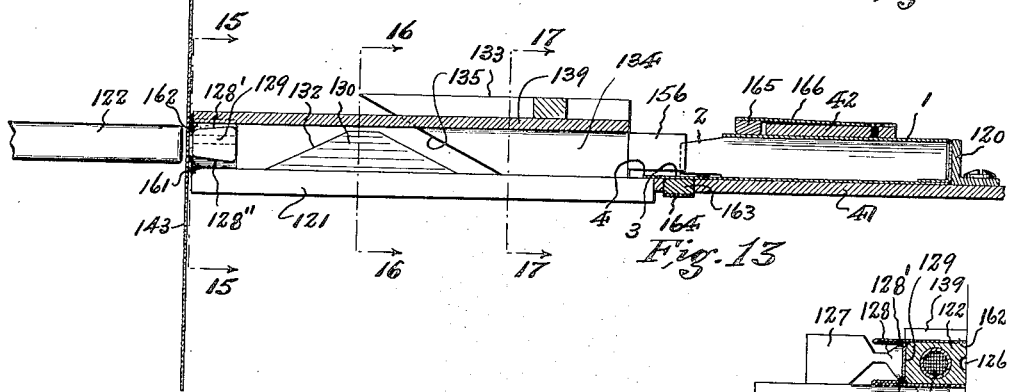
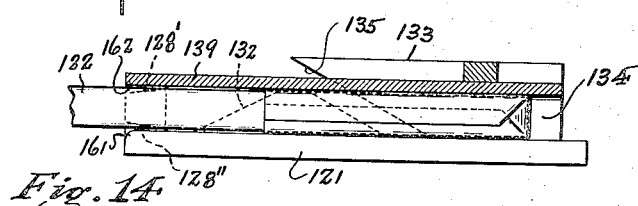
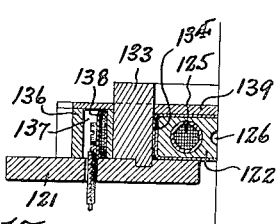
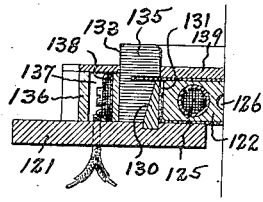

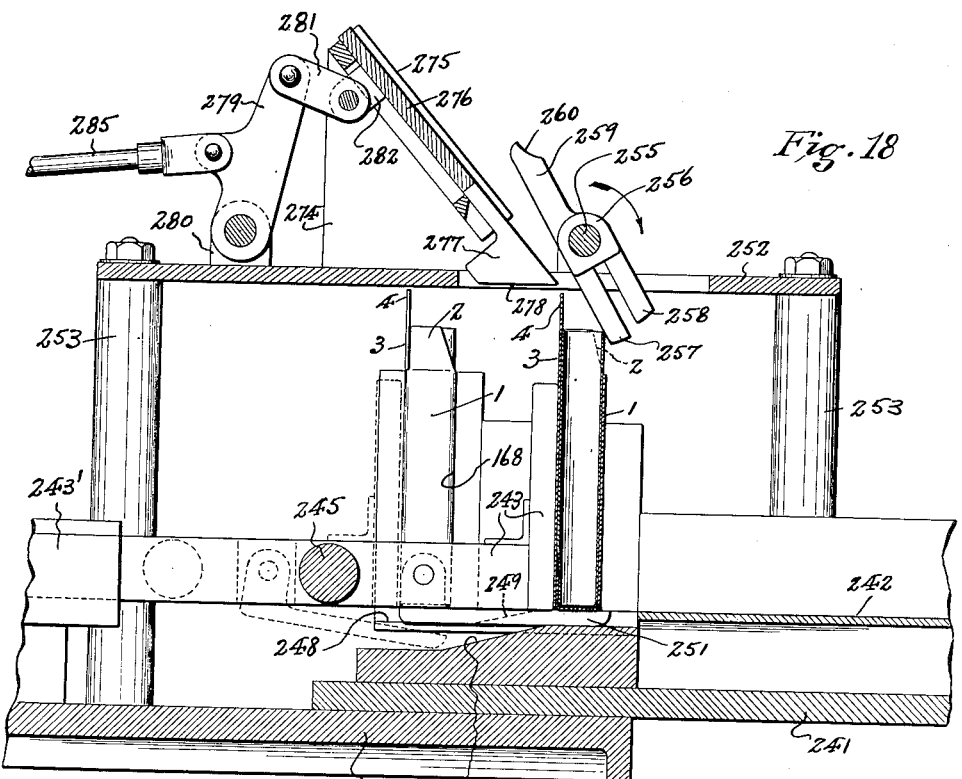
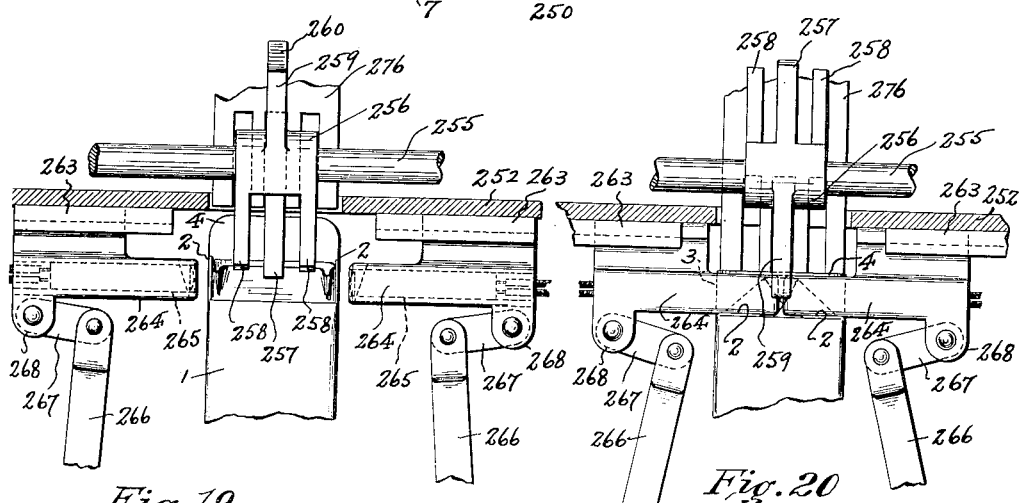

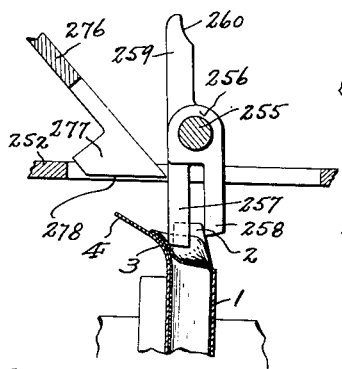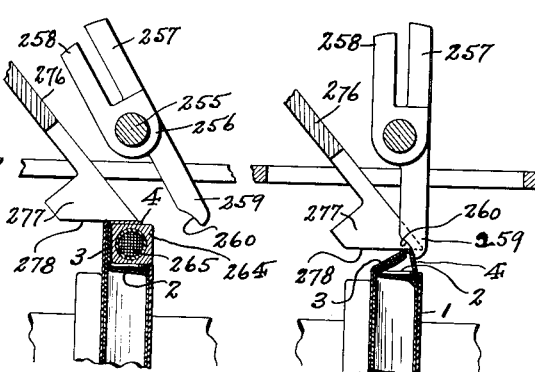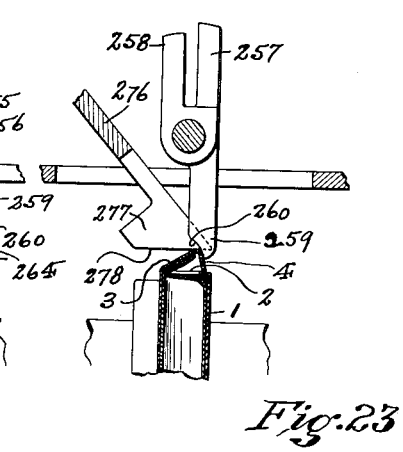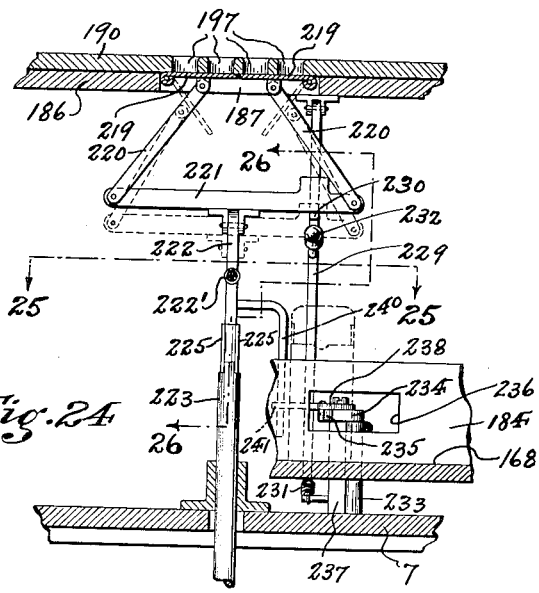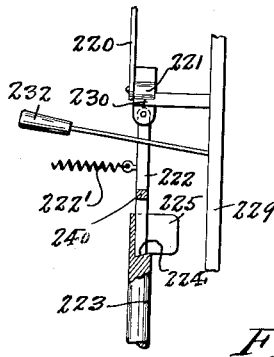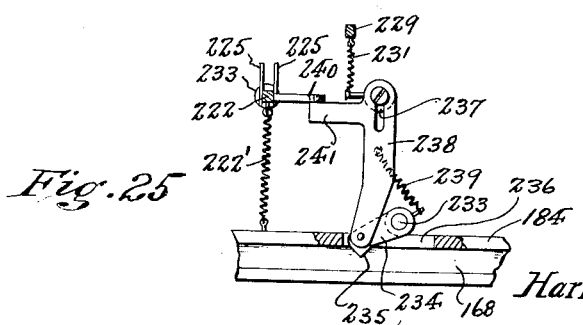

1,622,709

UNITED STATES PATENT OFFICE.

HARRY L. EVANS AND GEORGE I. HOHL, OF NEWPORT, RHODE ISLAND.

CARTONING MACHINE.

Application filed July 10, 1924. Serial No. 725,177.

This invention relates to an improved automatic machine for setting up, lining, filling, sealing and closing cartons or boxes; and the invention has for its principal object to provide a machine of the kind mentioned, which is adapted to automatically and successively manipulate cartons, which are furnished thereto in a collapsed or flat condition, to set up or square the carton, close the foldable portions at one end thereof, and thereupon form and insert into the same a wax paper lining, initially open at its outer end, while at the same time heating the wax which impregnates the lining paper to cause the laps and folds of the lining to adhere together, to thus seal the lining, and then filling the carton, thus set up and lined, with the product to be enclosed therein, whereupon the machine further operates to close and seal the initially open end of the lining, and then close the foldable end portions at the remaining end of the carton, and finally discharge the lined, filled, sealed and closed carton from the machine.

The invention has for a further object to provide a novel arrangement and organization of mechanisms whereby the several steps involved in manipulating, lining, filling, sealing and closing the cartons are co-ordinated and relatively timed for operation so that the cartons will successively and speedily pass through the machine, and in a manner whereby the various operations, while successively carried on with respect to a given carton, are simultaneously carried on relative to a group of cartons in progress through the machine.

In its more specific aspect this invention has for further objects to provide a very simple and rapidly acting means for opening or squaring the carton body and closing the flap at one end thereof; to provide a novel means for preforming a sealed lining having an open outer end and inserting the same in the carton; to provide a means for filling the lined carton; and to provide a novel and rapidly acting means for closing and sealing the open end of the lining, while also closing the flaps at the remaining end of the carton.

Other objects of this invention, not at this time more particularly enumerated, will be clearly understood from the following detailed description of the same.

The invention is clearly illustrated in the acompanying drawings, in which:—

Figure 1:
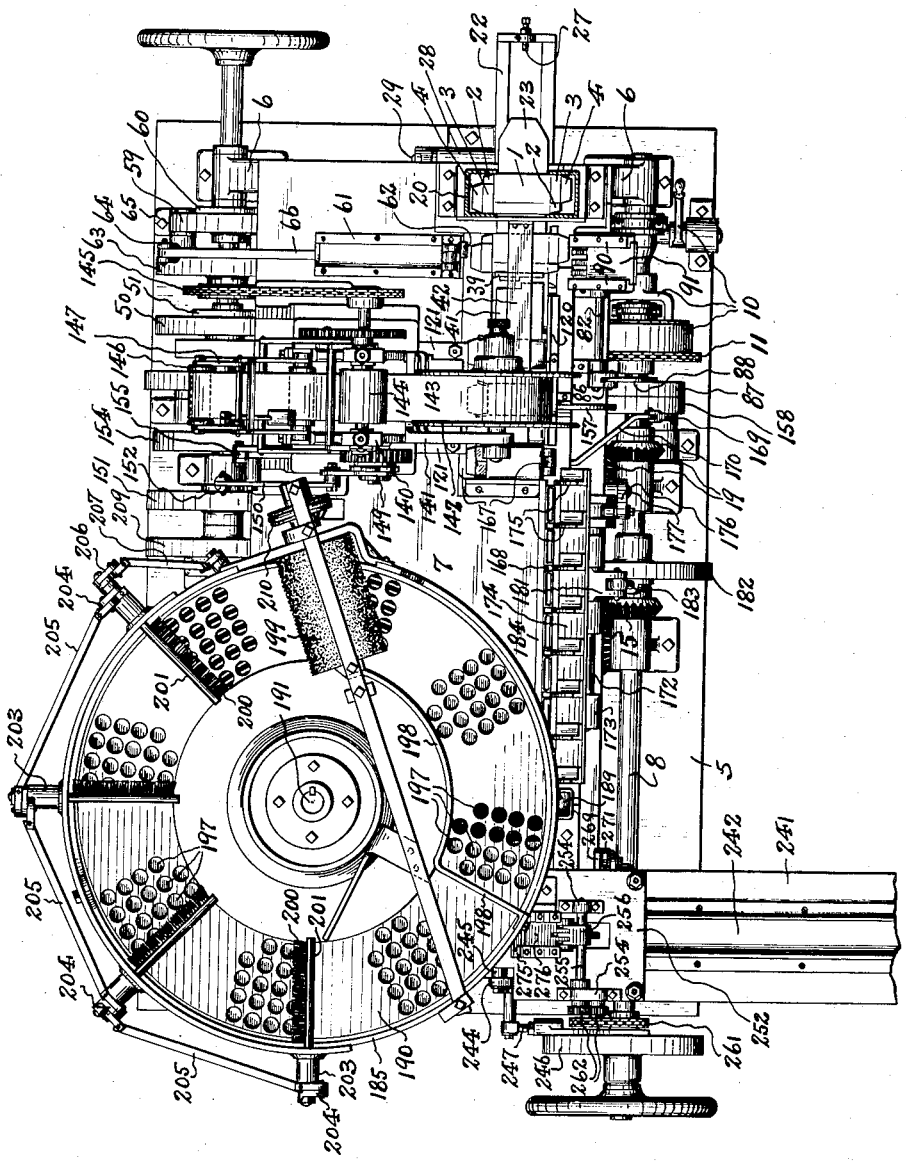
Figure 2:
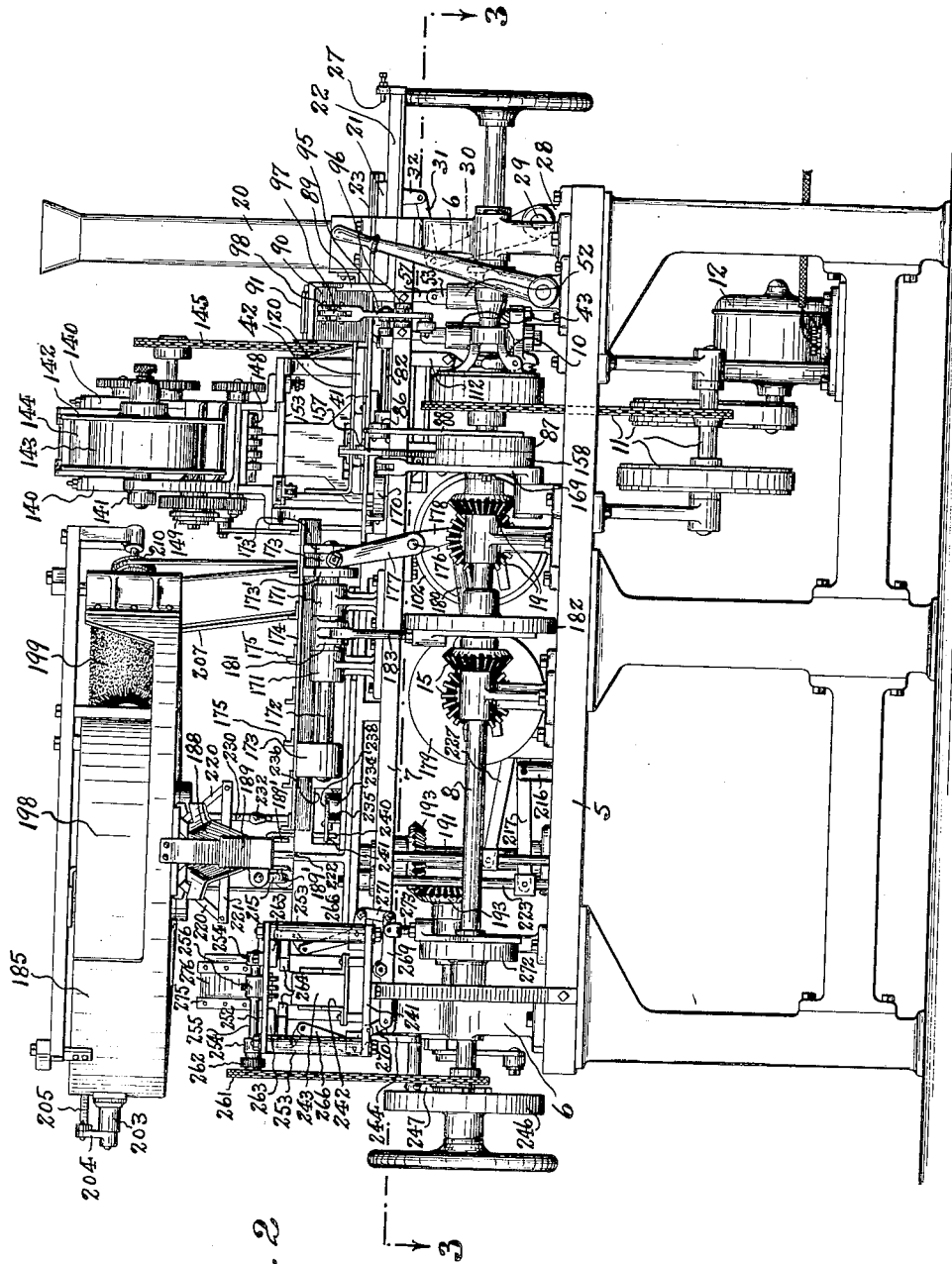
Figure 3:
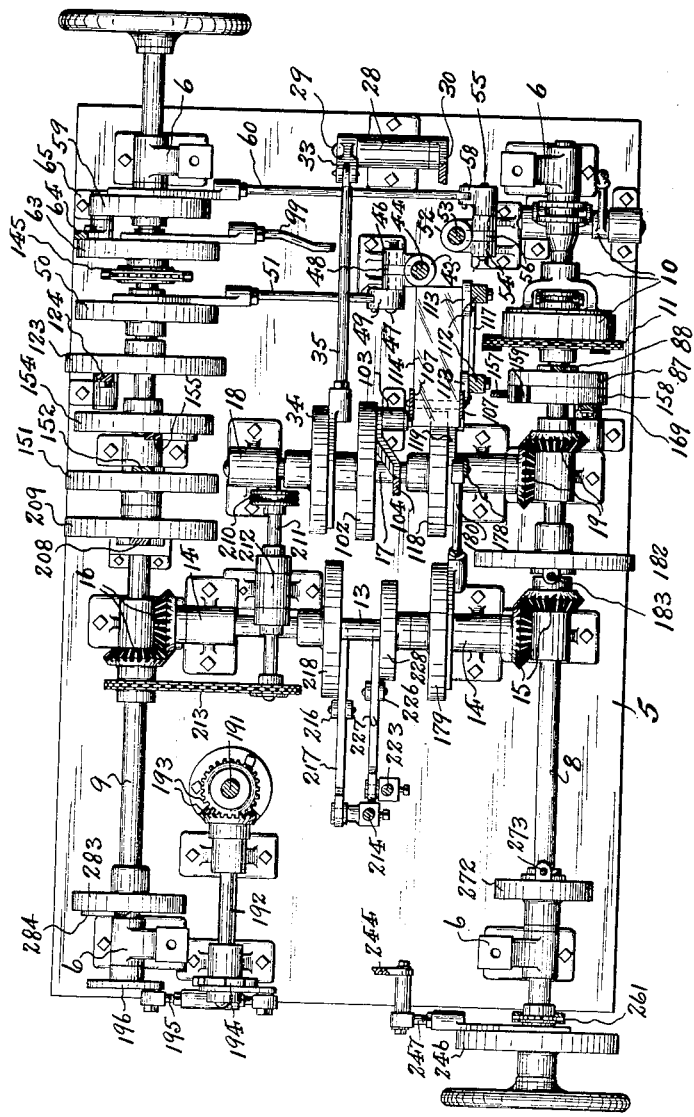

Figure 1 is a plan view of the novel cartoning machine made according to and embodying the principles of this invention; Figure 2 is a side elevation of the machine; and Figure 3 is a horizontal section taken on line 3—3 in Figure 2, the same showing the power transmission and timing devices controlling the operation of the various mechanisms making up the machine.

Figures 4 to 6 inclusive are enlarged fragmentary views illustrating the structure and mode of operation of the mechanisms for delivering and squaring the flat cartons, and then conveying the same into position to receive the wax paper lining.

Figures 7 and 8 are fragmentary enlarged views showing the structure and operation of the means for closing the side tabs at one end of the squared carton; and Figures 9 to 11 inclusive are fragmentary enlarged vertical sections showing the structure and operation of the means for folding, closing and tucking the end closure flap at one end of the squared carton; Figure 12 is an enlarged detail plan view (with cover plate removed) of the wax paper lining forming and inserting mechanism, and Figure 13 is a longitudinal vertical section through the same, taken on line 13—13 in said Figure 12; Figure 14 is a fragmentary longitudinal vertical section, similar to that shown in Figure 13, but showing the manner of forming the wax paper lining on the plunger or mandrel; Figures 15, 16 and 17 are respectively fragmentary cross sections taken on the section lines 15—15, 16—16, and 17—17 in said Figure 13, but with the plunger shown as advancing the wax paper through the lining forming devices; Figure 18 is an enlarged fragmentary vertical section showing the structure of the means for closing the open end of the lining and the remaining open end of the carton; Figures 19 and 20 are enlarged transverse sections showing the side tab closing devices and sealing means for closing the open end of the lining; Figures 21, 22 and 23 are fragmentary vertical sections showing the various stages of closing and sealing the open end of the lining, and folding the side tabs and folding, closing and tucking the end closure flap at the remaining end of the filled carton; Figure 24 is a fragmentary transverse section, showing the means for automatically shutting-off the supply of goods to be filled into cartons after the passage of a last carton to filling position; Figure 25 is a detail horizontal section, taken on line 25—25 in said Figure 24; and Figure 26 is a detail vertical section taken on line 26—26 in said Figure 24.

Similar characters of reference are employed in all of the hereinabove described views, to indicate corresponding parts.

The novel machine is adapted to manipulate that type of commercial carton or container comprising a rectangular hollow body 1 having open opposite ends, at which are provided inwardly foldable side tabs 2 and a foldable closure flap 3 having a tuck-portion 4 at its free end. Cartons of this type are generally made of light cardboard and furnished by the manufacturer to the user in collapsed or flat form (see Figures 1 and 4), with the side tabs 2 and closure flaps 3 projecting in unfolded condition from the respective ends of the carton body 1. The operation of raising the body 1 of the carton from such initial flat or collapsed condition to properly set up or opened condition is frequently spoken of by users as "squaring" the carton, and is an operation which must be performed before the side tabs and closure flaps can be closed or the carton filled. After squaring the carton body and before filling the same, one end thereof is closed, by turning inwardly the side tabs 2 and then folding down the end closure flap 3, while at the same time tucking into the carton body the tuck-portion 4 of the latter, the carton being thus made ready for lining, filling, and final closing, in a similar manner, of the opposite or remaining open end thereof. The machine, which is the subject of the present invention, is adapted to receive the flat or collapsed cartons, stacked one upon another, into a suitable holder or magazine, from which the same are successively ejected to thereupon undergo the squaring, one end closing, lining, filling and final or remaining end closing operations.

The reference character 5 indicates a suitably supported base plate or bed, upon which is in turn supported, by standards 6, a deck plate or platform 7, which is spaced above said bed in horizontal parallel relation thereto. Each pair of longitudinally opposed standards 6 also provide bearings for power transmission shafts 8 and 9, disposed one at each side of the machine, intermediate the bed 5 and platform 7. The shaft 8 is started, driven and stopped by means of a clutch mechanism 10 with which the same is provided. Said clutch mechanism 10 is operated through suitable transmission means 11 from any suitable source of power, such e. g., as the electric motor 12. The shaft 9 is driven from said shaft 8 by a suitably disposed intermediate transverse shaft 13, which is supported in bearings 14 mounted on said bed 5; the shafts 8 and 13 are operatively intergeared by meshing bevel gears 15, and, in a similar manner, the shafts 13 and 9 are operatively intergeared by meshing bevel gears 16. A second transverse shaft 17 is provided, the same being supported in bearings 18, and being driven from said shaft 8 by intermeshing bevel gears 19.

*The carton delivery and squaring mechanism.*

Supported upon the right hand end of said platform 7, adjacent to the front longitudinal margin thereof, is a magazine or stacker 20, which is adapted to contain a supply of the initially flat or collapsed cartons which are to be passed through the machine. Means are provided for successively ejecting the flat cartons from said magazine or stacker 20, and delivering the same to the squaring and one end closing devices, said means comprises a slide block 21, which is reciprocated in guides 22, and which is provided with a plunger plate 23. The forward movement of the plunger plate 23 engages and pushes outwardly, from the magazine or stacker 20, the bottom carton of the stacked supply thereof. Said plunger plate 23 is provided with slideways 24 which operatively engage longitudinal-guide ribs 25 possessed by the slide block 21. Said guide ribs 25 are faced with friction plates 26, made of fibre or other suitable material, so that said plunger plate 23 is frictionally bound to said slide block 21 to normally move therewith, but is nevertheless rearwardly yieldable relative to said slide block, should the engaged carton offer abnormal resistance to the ejecting pressure of said plunger plate 23. This arrangement is believed to be novel, and is an important detail of construction, having for its object the prevention of waste by saving the cartons from mutilation in the event there is any temporary jamming thereof in the magazine or stacker 20. In case the plunger plate 23 is rearwardly moved relative to the slide block 21, under the circumstances above intimated, the same will be automatically returned to normal relation to the slide block 21, by reason of the rear end of the plunger plate being brought, by the retractive movement of the slide block 21, into engagement with the adjustable plunger plate repositioning stop 27, which is mounted in the rear end of the frame providing the guides 22. The means for producing a properly timed reciprocation of the carton ejecting plunger plate 23 comprises a fulcrum post 28 in which is journaled a spindle 29. Secured upon one end of said spindle 29 is a lever 30, the free end of which is connected through a link 31 with an arm 32 which depends from the underside of said slide block 21. Secured upon the opposite end of said spindle 29 is another lever 33. Fixed on said transverse shaft 17 is a race cam 34 which actuates a connecting rod 35, the latter being pivotally connected with the free end of said lever 33, whereby said lever 33 is oscillated to in turn oscillate said lever 30, the movement of which produces, through the link 31, the properly timed reciprocatory movements of said slide block 21 and the plunger plate 23 carried thereby.

Situated in front of said magazine or stacker 20 is a carton support or saddle 36, which is horizontally alined with the bottom of said magazine or stacker so as to receive the carton ejected from the bottom of the stack by the plunger plate 23. Pivotally connected with said saddle 36, so as to cooperate with the respective transverse sides of the saddle, are vertically swinging carton grippers 37 and 38, which are respectively provided with upwardly projecting transverse gripping lugs 39 and 40, which, when operatively raised to vertical positions, determine or limit a space intermediate the same equal to the width of an expanded or squared carton; said saddle 36 forming the bottom or carton supporting portion of such space. Fixed upon the platform 7, in longitudinal and horizontal alinement with said saddle 36, is a carton slideway 41. Spaces are provided intermediate the saddle 36 and the receiving end of said slideway 41, and the saddle 36 and the magazine or stacker 20, in which the respective grippers 37 and 38 and their gripping lugs 39 and 40 may oscillate when operated. A top or keeper plate 42 extends forwardly from the magazine or stacker 20 above the saddle 36 and slideway 41, the same being spaced from the latter parts for a distance equal to the thickness of the expanded or squared carton. The means for producing the properly timed vertical oscillations of the gripper 37 and its gripping lug 39, comprises a vertical guide block 43, which is fixed upon said bed 5 beneath the platform 7. Supported by said guide block for vertical reciprocation therein is a jack member 44, the upper free end of which is pivotally interconnected with said gripper 37 by a link 45. Said guide block is provided with a transverse bearing portion 46, in which is journaled a spindle 47, upon which is fixed a segment gear 48, which meshes with rack teeth with which the body of said jack member 44 is provided. Secured upon one end of said spindle 47 is a lever arm 49. Secured upon said shaft 9, in a suitable location, is a race cam 50 which actuates a connecting rod 51, the latter being pivotally connected with the free end of said lever arm 49, whereby said lever arm is oscillated to in turn oscillate said segment gear 48 which produces the properly timed vertical reciprocatory movements of said jack member 44, and thereby swings upward and downward, at proper times, the gripper 37 and its gripping lug 39. A similar arrangement of actuating means is provided for actuating the gripper 38 and its gripping lug 40; such means comprising a guide block 52, a vertically reciprocatory jack member 53, said guide block having a transverse bearing 54 in which is journaled a spindle 55 for actuating a segment gear 56, which meshes with rack teeth with which said jack member 53 is provided. The upper free end of said jack member 53 is pivotally interconnected with said gripper 38 by a link 57. The spindle 55 is provided at one end with a lever arm 58. Secured upon the shaft 9 is a race cam 59 which actuates a connecting rod 60, the latter being pivotally connected with the free end of said lever arm 58, whereby said lever arm is oscillated to in turn oscillate said segment gear 56 which produces the properly timed vertical reciprocatory movements of said jack member 53, and thereby swings upward and downward, at proper times, the gripper 38 and its gripping lug 40.

Mounted for horizontal reciprocating movement in a guide block 61 fixed on said platform 7 is a flat clamp blade 62, which is alined with the carton receiving space provided by said saddle 36 and the associated carton gripper devices. The means for producing a properly timed reciprocation of said clamp blade 62 comprises a race cam 63 which actuates a lever 64 pivotally fulcrumed in connection with a fulcrum block 65 fixed on the bed 5. Interconnecting said clamp blade 62 with the free end of said lever 64 is a connecting link or rod 66.

The plunger plate 23 being retracted to its initial position, the stack of cartons will rest upon the bottom of the magazine or stacker 20, with the lowermost or bottom carton lying edgewise in the path of the plunger plate. The magazine or stacker is so constructed as to permit the outward forward movement of said lowermost carton while retaining the rest of the cartons within the stack; consequently a forward movement of the plunger plate 23 will push outwardly and forwardly said lowermost carton to propel the same on to the saddle 36. When the outward movement of the lowermost carton is thus produced, the carton grippers 37 and 38 are so positioned, that the gripper 38 and its gripper lug 40 are swung downwardly out of the path of the outwardly moving carton, but the gripper 37 and its gripping lug 39 are swung upwardly so that the latter bounds the far side of the saddle 36 and thus forms an abutment or stop against which the carton is brought to rest when deposited upon the saddle 36 by the forward movement of the plunger plate 23 (see Figure 4). When the carton has thus been deposited upon the saddle 36, the clamp blade 62, under the properly timed operation of its actuating means, moves forward and enters endwise into the carton to engage and hold the lower face portion of its body 1 firmly secured and seated upon the surface of the saddle 36. The carton is stopped against longitudinal displacement, during the entrance of the clamp blade 62 thereinto by engagement with an abutment block 67, which is opposed to the outer transverse edge of the lower face portion of the carton body. Said abutment block 67 is secured to a portion of the carton slideway 41 which straddles the saddle 36, and the free end of said abutment block 67 possesses a small outwardly projecting overhanging lip 68, under which the said transverse edge of the lower face portion of the carton body engages, to thus prevent the latter from riding upwardly and over the stopping end of said abutment block (see Figure 9). After the clamp blade 62 has thus engaged the carton deposited upon the saddle 36, the gripper 38 and its gripping lug 40 are swung upwardly, by the properly timed operation of the actuating means therefor, against the carton body portions which overhang the nearer side of the saddle 36 thereby turning upwardly the sides of the carton to operative right angled extension relative to the lowermost face portion, and at the same time lifting up the uppermost face portion to operative spaced relation to said lowermost face portion, thus squaring or setting up the carton in open or expanded condition. It will be understood that the carton bodies are longitudinally scored in the usual manner, and that consequently the bending of the carton side and face portions along the lines of such scores will be easily effected by the above described operation. Upon the completion of the squaring operation the carton body will be held upon the saddle and gripped intermediate the gripping lugs 39 and 40 (see Figure 5). The carton is thus held in expanded or squared position with its side tabs and end closure flaps extending endwise therefrom, and subject to the operation of the means for closing said side tabs and end closure flap at one or the outer end of the same.

*The mechanism for closing one end of the carton.*

The means for operatively closing the side tabs 2 and end closure flap 3, with its tuck portion 4, at the outer end of the carton, comprises a fulcrum block 69, which is secured to the platform 7 adjacent to the outer end of said saddle 36. Pivotally mounted in connection with said fulcrum block 69, for vertical swinging movement thereon, are a pair of oppositely extending folder devices 70, provided at their free ends with inwardly turned folder fingers 71, disposed for direction toward the respective side tabs 2 of the outer end of the carton supported on the saddle 36. Said folder fingers 71 are provided at their inner vertical sides with flat side tab engaging surfaces 72; and their upper horizontal sides 73 are of a width equivalent to the length of the end closure flap 3, so that the tuck-portion 4 will project freely and outwardly beyond the outer upper edges of said folder fingers 71, under conditions to be subsequently described. The outer faces of said folder fingers 71 are chamfered or undercut, as at 74, to thus provide angular anvil portions 75 at the outer sides of said folder fingers 71, against which the tuck-portion 4 of the end closure flap 3 is downwardly and inwardly turned prior to folding down the latter to closing position and inserting said tuck-portion into the carton end. The means for producing the properly timed vertical oscillations of said folder devices 70 and their folder fingers 71, comprises a vertically reciprocable slide plate 76, having guide slots 77 engaged over guide lugs 78 which project outwardly from the outer face of said fulcrum block 69. The platform 7 is provided with a suitable opening 79 through which said slide plate 76 may move when operated. The slide plate 76 is provided at its upper end with oppositely directed perforate ears 80 into which extend, respectively from each folder device 70, coupling studs 81. Vertical reciprocation of said slide plate 76 will produce operative vertical oscillations of said folder devices 70 and the folder fingers 71 thereof. The means for producing the timed vertical movements of said slide plate 76, comprises a longitudinal rock-shaft 82, which is journaled in bearings fixed on said platform 7. Secured to said rock-shaft 82 is a lever-arm 83, which projects toward said slide-plate 76, and the free slotted end of which is pivotally connected or coupled to said slide plate 76 by a cross-pin 84 supported in a yoke or bearing 85 attached to and projecting from the outer face of said slide plate. Secured upon said rock-shaft 82 is an outwardly projecting lever arm 86. Secured upon said power shaft 9, in a suitable location, is a race cam 87 which actuates a vertically reciprocable connecting rod 88, the latter being pivotally connected with the free end of said lever arm 86, whereby said lever arm 86 is oscillated to rock said rock-shaft 82 and in turn oscillate said lever arm 83, which produces the properly timed vertical reciprocations of said slide plate 76, and thus in turn produces the timed up and down swinging movements of said folder devices 70 and their folder fingers 71.

Located in front of said folder devices, and supported from the platform 7 by a bracket member 89, is a downwardly and inwardly inclined guide plate 90, upon which is slidably mounted a combined folding and tucking plate 91. The free inner end of said folding and tucking plate 91 is provided with forwardly or inwardly extending and substantially horizontal bending projections 92 adapted to operatively bend downwardly and inwardly the tuck portion 4 of the carton end closure flap 3. Extending upwardly from the inner ends of said bending projections 92 is a folder foot 93 provided with a substantially vertical pressing face 94. The means for reciprocating said folding and tucking plate 91, comprises a rocking lever 95 which is pivoted to a fulcrum support 96 secured to the front edge of said platform 7. The upper arm of said rocking lever 95 is pivotally interconnected by a link 97 to a coupling knuckle 98 which depends from the outer end of said folding and tucking plate 91. The race cam 63 is provided with an additional cam race which actuates a connecting rod 99, the latter being pivotally connected with the lower arm of said rocking lever 95, whereby said rocking lever is oscillated to produce through the interconnecting link 97 the properly timed reciprocations of said folding and tucking plate 91.

In operation, while the squared carton is gripped and held upon the saddle 36, an upward swinging motion is imparted to the folder devices 70 by the timed upward sliding of the slide plate 76. This upward swinging movement of the folder devices 70 carries inwardly the folder fingers 71, which respectively move toward and engage the outer faces of the respective projecting side tabs 2 at the adjacent end of the squared carton, and having engaged said side tabs 2, he folder fingers 71 continue to swing inwardly and toward each other, thus folding over the side tabs 2 across the open end of said carton (see Figures 7 and 8). When the folder devices reach the limit of upward swing, the respective folder fingers 71 are positioned to underlie the end closure flap 3, with the tuck-portion 4 of the latter projecting freely outwardly therefrom (see Figure 9). The means for actuating the folder devices 70 operates to produce a dwell of the latter while in the operative raised position above described. During the dwell of the folder devices 70 and their fingers 71 in operative raised position, the means for actuating the folding and tucking plate 91 imitates, the downward and inward sliding movement thereof, which carries the bending projections 92 against the top side of the freely projecting tuck-portion 4 of the end closure flap 3, whereby the continued movement of the folding and tucking plate causes said bending projections 92 to bend said tuck portion downwardly and inwardly around the angular anvil portions 75 of the folder fingers 71, to thus direct the free end of the tuck-portion 4 inwardly toward the open end of the carton, into which the same is to be inserted, before the end closure flap is bent or folded down to closed position (see Figure 10). By the time said tuck portion has been thus downwardly bent and inwardly directed toward the open end of the carton, the actuating means for the folder devices 70 and their folder fingers 71 operates to swing downwardly said folder devices 70 and thus retract said folder fingers 71, whereupon a continued downward movement of the folding and tucking plate 91 brings the pressing face of the folder foot 93 into engagement with the end closure flap 3 to in turn swing or bend down the same into closed relation to the open end of the carton and across the closed side tabs 2, while at the same time pushing the free end of the tuck portion 4 into the open end of the carton, said tuck portion 4 being guided by riding on the top side of the abutment block 67 so as to easily enter the mouth of the carton, these movements being continued until the tuck portion 4 is entirely entered within the carton, and the end closure flap 3 closed tightly down across the end of the carton (see Figure 11).

After one end of the squared carton has been closed in the manner above described, the same is removed from the saddle 36 by a transfer or carrier mechanism, and deposited upon the carton slideway 41, which also serves to position a previously squared and one end closed carton in position to receive an interior lining of wax paper.

This transfer or carrier mechanism comprises a longitudinally reciprocable carrier block 100 which is slidably mounted in a slideway 101 fixed upon the platform 7 beneath the carton slideway 41. The means for reciprocating said carrier block 100 comprises a race cam 102, which is mounted on said transverse shaft 17. Pivoted to a fulcrum block 103, fixed on the bed 5, is an upwardly extending lever 104 adapted to be oscillated by said race cam 102. The upper free end of said lever 104 is interconnected with said carrier block 100 by a link 105. Connected with said carrier block 100 so as to travel therewith, but secured by pin and slot connections 106 so as to be capable of vertical up and down movement relative to said carrier block 100 are carrier plates 107, which are provided at their rearward free ends with carton engaging portions 108 having in their upper marginal portions seats 109 to receive the carton to be carried away from said saddle 36. The carton slideway 41 is suitably slotted to permit the upward projection of said carton engaging portions 108 therethrough, and the platform 7 is provided with an opening 110 to permit the downward projection of said carrier plates 107 therethrough. The forward ends of said carton engaging portions 108 form shoulders 111 adapted, at proper times, to engage and move a previously squared and one end closed carton to lining receiving position. Fulcrumed upon posts 112, which depend upon the underside of the platform 7, are bell crank devices 113. Pivotally connected with the substantially horizontal members of said bell-crank devices 113, so as to extend longitudinally and horizontally therebetween, and so as to be supported thereby, is a vertically oscillatable guide cradle 114 which provides a guideway 115 for a roller 116 journaled to extend between the lower extremities of said carrier plates 107, to thereby support the latter and control the raised and lowered positions of the same as governed by the rise and fall of said guide cradle 114. The rise and fall of said guide cradle 114 is produced by the oscillation of said bell-crank devices 113, which move harmoniously, the substantially vertical members thereof being connected together by a link 117 to such end. The properly timed oscillatory movements of said bell-crank devices 113 are produced by means of a race cam 118, which is also mounted on said transverse shaft 17, and which actuates a connecting rod 119, the free end of which is connected with the vertical member of one of said bell-crank devices.

After depositing a previously squared and one end closed carton upon the carton slideway 41 (see Figure 4), and while the succeeding carton upon the saddle 36 is being manipulated, the bell-crank devices 113 are actuated to drop the guide-cradle 114 to lowered position, to thereby lower the carton engaging portions 108 of the carrier plates 107 (see Figure 5), so that the same may pass rearwardly beneath the manipulated carton which is ready in turn to be removed from the saddle 36. While in such lowered position, the carrier plates 107 are moved rearwardly by the timed rearward sliding movement of the carrier block 100, until the carton engaging portions 108 are vertically alined beneath the ends of the manipulated carton on the saddle 36. After the carrier plates 107 and their carton engaging portions 108 arrive in such alined position, the bell-crank devices 113, by the timed operation of their actuating means, are turned back to normal positions to thereby again raise the guide cradle 114, and thus lift the carton engaging portions 108 into operative engaged relation to the manipulated carton on the saddle 36 (see Figure 6). Prior to the forward carrying movement of said carrier plates 107 and the carton engaging portions 108, whereby the carton is removed from the saddle 36 and deposited on the carton slideway 41, the timed operation of the means controlling the movement of the carton gripper 37 operates to turn the latter downward out of the path of the carton, so that the latter may pass freely off of the saddle 36 and on to the carton slideway 41 (see Figure 6). The return or forward movement imparted to carrier block 100 moves forward the carrier plates 107, whereby not only is said succeeding carton removed from the saddle 36 and deposited upon the slideway 41, but the previously deposited carton is engaged by the shoulder 111 and pushed forward on the slideway 41, so as to be alined with the wax paper lining mechanism, being thus positioned ready to receive the insertion thereinto of the wax paper lining formed and delivered thereto by said latter mechanism.

*The mechanism for forming and inserting the carton lining.*

Arranged on the outer longitudinal marginal portion of said carton slideway 41 is a stop flange 120, against which the closed end of the carton is engaged, when the same is deposited upon the slideway and moved to lining receiving position. The carton is postioned to lie transversely of the slideway 41, with its open end inwardly directed.

Supported from said platform 7, so as to lie flush with and extend transversely toward the inner longitudinal margin of said carton slideway 41, are supporting plates 121 upon which are mounted the lining forming devices, spaced apart to provide a mandrel passage in which moves a transversely reciprocable plunger or mandrel 122, which is actuated through the medium of a race cam 123 mounted on the shaft 9, whereby a lever 124, to the free end of which is suitably interconnected the rear end of said plunger or mandrel, is oscillated, to thus produce properly timed forward and retractive movements of said plunger or mandrel. The forward operative end of said plunger or mandrel is heated by means of electrical heating elements 125, which are imbedded therein to respectively lie adjacent to the sides of said plunger or mandrel. Said plunger or mandrel is provided with a central longitudinal air conduit or passage 126 open at its rearward end to the atmosphere, and terminating at the forward extremity of said plunger or mandrel. The lining forming devices comprise a pair of tucking blocks 127 mounted upon the supporting plates 121 one on each side of the entrance end of said mandrel passage. Said tucking blocks are provided at their inwardly directed ends with substantially T-shaped tucking members 128, the vertical end faces 129 of which are spaced from the sides of the plunger or mandrel 122 (when the latter is passed between the tucking blocks) for a distance substantially equivalent to the thickness of the lining paper to be employed in the formation of the carton lining. Mounted upon the supporting plates 121 beyond said tucking blocks 127 are bottom folders or up-turning folder members 130, the inner vertical faces 131 of which are alined respectively with the faces 129 of said tucking members 128. Said up-turning folder members 130 are provided with upwardly and forwardly inclined edges 132 which form fold-turning guides faced toward the leading end of the plunger or mandrel 122. Also mounted upon the supporting plates 121 beyond said up-turning folder members 130 are top folders or down-turning folder members 133, the inner vertical faces 134 of which are alined respectively with the vertical faces 129 of said up-turning folder members 130 and the vertical faces 129 of said tucking members 128. Said down-turning folder members 133 are of greater width than the up-turning folder members 130, and are provided with downwardly and forwardly inclined end portions 135 which form fold-turning guides faced toward the leading end of the plunger or mandrel 122. Supported upon said supporting plates 121, and in contact with the outer side faces of said down-turning folder members 133, are heater housing members 136, which are provided with internal chambers 137, in which are housed electric heating elements 138, which serve to generate and transmit heat to said down-turning folder members 133. Suitably supported, so as to bridge the plunger or mandrel passage intermediate the respective laterally opposed tucking and folding devices above described, is a cover plate 139.

A suitable means for supplying wax lining paper for manipulation by the plunger or mandrel 122 and the tucking and folding devices is provided. This means may be of any desired construction, which will serve to introduce a sheet of wax lining paper intermediate the retracted plunger or mandrel 122 and the tucking and folding devices. It is preferable to supply the wax lining paper, of a predetermined proper width, from a roll, from which the paper is automatically withdrawn and fed into place in front of the plunger or mandrel 122, and then severed to produce a separate sheet of desired length. The mechanism, as shown in the drawings, (see Figures 1, 2 and 3) for thus feeding the wax lining paper comprises a suitable frame-work 140 mounted upon the platform 7 above the plunger or mandrel and the tucking and folding devices. The frame-work 140 is provided with a forwardly projecting bracket 141 for supporting the spindle on which is mounted, for free rotation, the reel 142 upon which a supply of wax lining paper 143 is wound. Mounted in the upper end of said frame-work 140 are continuously running intergeared feed rollers 144 which draw the paper off of the supply roll. Said rollers 144 are driven from said transmission shaft 9 by a chain and sprocket drive 145. The paper passes from said continuously running rollers 144 to a counter-poised take up roller 146 which is supported from the framework 140 by a swinging frame 147, and which forms a loop of the paper intermediate said continuously running rollers 144 and a pair of intergeared intermittently actuated feed rollers 148 which feed the paper, in timed relation to the reciprocal movements of the plunger or mandrel, so that the same passes downwardly in front of the leading end of said plunger or mandrel 122, when the latter is retracted. Said feed rollers 148 are actuated by a pawl and ratchet transmission 149, the operations of which are produced by pivoted lever 150. Secured upon said transmission shaft 9 is a race cam 151 which actuates a vertically reciprocable connecting rod 152, the latter being pivotally connected with the outer free end of said lever 150, whereby the latter is oscillated to produce the properly timed actuation of said pawl and ratchet transmission 149 to in turn produce the desired intermittent rotation of the feed rollers 148. When a proper length of paper 143 has been fed down to desired position in front of the plunger or mandrel 122, and as the forward operative movement of the latter is initiated, the desired predetermined length of paper is severed from the main run thereof by a horizontally oscillating shear blade 153, the timed operation of which is produced by a race cam 154 on said shaft 9, which oscillates a lever 155 suitably interconnected with the shear blade for transmitting the desired operative movement thereto.

As the carton moves into position to receive the lining, the longitudinally projecting side tab 2, at the forward or left-hand side of the carton body, springs past a stationary tab spreader lug or finger 156, which is secured to and projects from the outer end of the right-hand down-turning folder member 133, but the side tab 2 at the rearward or right-hand side of the carton body is arrested by engagement with said stationary tab spreader or finger 156, so as to be bent or sprung outward whereby the same is slightly deflected from the path of the plunger or mandrel 122 as it carries forward and enters into the carton interior the preformed lining for insertion within the latter (see Figure 12). A means is also provided for deflecting the forward or left-hand side tab 2 after the carton is alined with the paper lining forming and inserting mechanism.

This latter means comprises a vertically oscillatable lever 157, which is fulcrumed on the outer margin of said carton slideway 41. The outer end of said lever 157 is extended outwardly and bent downwardly, so that its free extremity rides upon the circumference or periphery of an actuating cam 158 mounted on said transmission shaft 8. Said cam 158 has a trip depression 159 in its periphery which controls the properly timed oscillation of said lever 157. Fixed on the inner free end of said lever 157 is a downwardly projecting spreader lug or finger 160, (see Figures 4, 5, 6 and 12) which possesses a chamfered free end. When the carton is alined in lining receiving position, and as the plunger or mandrel 122 with the preformed lining thereon approaches the open end of the carton to insert the lining thereinto, the lever 157 is oscillated, by its timed actuating means, to swing downwardly the spreader lug or finger 160 into engagement with the left-hand or forward side tab 2, to thereby spread or deflect the same outwardly or away from the approaching plunger or mandrel and the lining carried thereby.

In operation, while the plunger or mandrel 122 is in retracted position, the paper feed mechanism delivers intermediate the plunger or mandrel and the tucking and folding devices a properly sized portion of the wax paper 143 (see Figures 12 and 13). The paper having been thus delivered, the advancing movement of the plunger or mandrel 122 is initiated by its timed actuating means while at the same time the portion of paper delivered is sheared or cut away from the main run thereof. The advancing movement of the plunger or mandrel 122 carries the severed paper sheet against the lower lip 161 formed by the adjacent end margins of the supporting plates 121 and against the upper lip 162 formed by the adjacent end margin of the cover plate 139, whereby, as the plunger or mandrel enters the passage bounded on the sides by the tucking and folding devices, and respectively at the bottom and top by the supporting plates 121 and cover plate 139, the upwardly and downwardly extending portions of the paper are folded or doubled back upon the plunger or mandrel, so as to lie respectively flat against the top and bottom surfaces of said plunger or mandrel. Since the width of the paper is greater than the width of the plunger or mandrel, longitudinal marginal and foldable portions of the same will be left projecting from each side of the plunger or mandrel at the top and bottom thereof. As the plunger or mandrel carries the paper inwardly between the tucking blocks 127, the opposing ends of the T-shaped tucking members 128 will engage the laterally projecting portions of the fold of paper which is turned around the leading end of the plunger or mandrel, and will force or tuck such portions backwardly against the sides of the plunger or mandrel, as such portions of the paper are turned and passed between the vertical end faces 129 of said T-shaped tucking members 128 and the sides of the plunger or mandrel, while the longitudinal marginal and foldable portions projecting from each side of the plunger or mandrel, at the top and bottom thereof, will be substantially undisturbed and will respectively pass between top edges 128' of the T-shaped tucking members 128 and the cover plate 139, and between the bottom edges 128'' of the T-shaped tucking members 128 and the supporting plates 121 (see Figure 15). It is preferable that the respective top and bottom edges 128' and 128'' of the T-shaped tucking members 128 shall slightly converge in a direction opposed to the entering plunger or mandrel, so that no undue strains are exerted upon the paper when producing the tucking folds. As the plunger or mandrel continues to advance the longitudinal marginal or foldable portions of the paper projecting beyond the bottom surface of the plunger or mandrel are carried into engagement with the up-turning folder members 130, the upwardly and forwardly inclined edges 132 of which engage and turn upwardly said foldable portions of the paper, so that the same pass between the sides of the plunger or mandrel and the vertical faces 131 of said up-turning folder members 130 (see Figure 16). As the plunger or mandrel further advances, the longitudinal marginal or foldable portions of the paper projecting beyond the top surface of the plunger or mandrel are carried into engagement with the down-turning folder members 133, the downwardly and forwardly inclined end portions 135 of which engage and turn downwardly said latter foldable portions, so that the same pass between the sides of the plunger or mandrel and the vertical faces 134 of said down-turning folder members 133, while at the same time causing the down-turned folds to overlap the previously formed up-turned folds of the paper (see Figures 14 and 17) thus completing the formation of a lining ready for insertion within the carton alined to receive the same.

It is desirable in many instances, especially when the lined cartons are to contain a product, the keeping qualities of which are enhanced if protected from the atmosphere, to hermetically seal the lining. To this end a wax or paraffin paper is provided for the formation of the lining, the wax or paraffin saturating the paper being readily fusible at comparatively low temperatures. When, therefore, a lining is formed by the movement of the plunger or mandrel through the tucking and folding devices, a proper application of heat will fuse the wax or paraffin and will cause overlapping and interfolded parts of the lining to adhere together, and will thus hermetically seal the joints formed at such overlapping and interfolded parts. It has, heretofore, been quite the comon practice in forming such sealed linings to heat the plunger or mandrel, but when the latter is the only source of or means for applying the heat, the sealing results are not always uniform or certain, especially in a comparatively high speed machine, such as the present invention seeks to provide. We have in the instant invention provided in addition to the heated mandrel, a means for heating the down-turning folder members 133 so that as the overlapped longitudinal folds of the lining are brought together, the wax or paraffin in each fold is independently supplied with fusing heat, so that immediately on contact one with the other the softened or melted wax or paraffin of one fold will at once fuse with the softened or melted wax or paraffin of the other fold, whereby a uniform union throughout their areas of mutual contact is effected, and the adjacency of a cold surface to one fold tending to non-uniform fusion of the contacting folds is avoided. This feature of our lining forming mechanism is deemed of considerable importance both as to novelty and utility.

The lining having been preformed and hermetically sealed in the manner above indicated, the plunger or mandrel, as it continues to advance, carries the lining onward and through the opposed open end of the awaiting carton, so as to insert the same into the interior of the latter. The lining having thus been entered in the carton, the retractive movement of the plunger or mandrel withdraws the latter leaving the lining in place within the carton. In order to prevent the withdrawing plunger or mandrel from effecting a suction tending to displace the lining from its operative inserted position, the plunger or mandrel is provided with an air passage 126, as above mentioned, so that air may enter the interior of the lined carton as the plunger or mandrel is displaced. Another factor which operates to prevent displacement of the lining from the carton as the plunger or mandrel withdraws, comprises a pair of carton pressure blocks which respectively engage the under side of the carton and the upper side of the carton, whereby the comparatively cold walls of the carton are pressed against the hot wax paper of the inserted lining to thereby cause the wax to congeal and adhere to said carton walls, thus holding the inserted lining against outward displacement. The said carton pressure blocks comprise, a lower pressure block 163 which is mounted upon a leaf spring 164 adapted to press the same upwardly through an opening in the carton slide-way 41 into engagement with the underside of the carton, and an upper pressure block 165, which is mounted upon a leaf-spring 166, secured to said keeper plate 42, and adapted to press the same downwardly against the upper side of the carton (see Figures 12 and 13).

After the sealed lining has been inserted in the carton, the forward movement of a succeeding carton, upon the carton slide-way, into position to in turn receive its lining, engages and pushes onward the former carton, whereby a previously lined carton is propelled on to a pivoted fly-plate 167 located at the end of said carton slide-way. This fly-plate 167 is adapted, at proper times, to swing upwardly and outwardly from an initial horizontal position to a vertical position, thus turning a lined carton upright on its closed end, and alined edgewise to a carton runway 168, through which the cartons are successively moved into a goods receiving position relative to a carton filling mechanism. The means for producing the properly timed operative movements of said fly-plate 167 comprises, a cam race in the face of said previously mentioned cam 158, which is mounted on the shaft 8. Said cam 158 is thus caused to oscillate a lever 169, the free end of which is operatively interconnected with said fly-plate by a link 170, whereby the timed oscillations of said lever 169 produce the properly timed up and down swinging movements of said fly-plate.

A means is provided for receiving and intermittently propelling lined cartons through the carton runway 168, and successively into goods receiving relation to the carton filling mechanism. This propelling means comprises suitable spaced bearings 171 which are supported upon the platform 7, and in which is mounted a longitudinally reciprocable rock-shaft 172. Secured to said rock-shaft by bracket blocks 173, so as to be supported thereby, is a longitudinal propeller device 174 having a series of inwardly projecting push-pieces 175, which are spaced apart one from another a distance slightly in excess of the width of the upstanding cartons. One of said bracket blocks 173 is provided with arcuate side flanges 173' to provide an intermediate channel or groove. The means for producing properly timed longitudinal reciprocal movements of said propelling means comprises, a spindle 176 journaled in bearings so as to extend transversely beneath said platform 7, upon the outer end of which is fixed an upwardly extending lever 177, having at its free end means engaged in the groove intermediate the side flanges 173' above mentioned. Secured upon the inner end of said spindle 176 in a downwardly extending lever 178.

Secured on said transverse shaft 13 is a race cam 179 which actuates a connecting rod 180, the free or outer end of which is pivotally connected with said lever 178. Said propelling means is arranged for lateral oscillatory movement by timed, rocking movements of said rock-shaft 172, whereby the same may be swung outwardly at the end of its propelling stroke, and held outwardly so that the push-pieces 175 will be removed from the path of the cartons in the runway 168 while the propelling means is being retracted, and then turned back to propelling position so as to engage with the rearward push-finger the carton upturned and alined with the runway 168, whereby said carton upon the next forward stroke of the propelling means is pushed into the said runway, and at the same time the previously delivered cartons are advanced a step toward filling position. The means for producing such properly timed lateral oscillations of said propelling means comprises, a lever 181 splined to said rock-shaft 172 intermediate the bearings 171, and a race cam 182 mounted on said shaft 8 adapted to actuate a vertical connecting rod 183, the upper free end of which is pivotally connected with the outer end of said lever 181. The runway 168 is provided along its inner longitudinal margin with an up-standing guard plate 184, which prevents lateral displacement of the cartons which are moved through said runway.

*The carton filling mechanism.*

The machine illustrated in the drawings, is provided with a means adapted to deliver into the carton a predetermined number of small objects, such, for example, as cough-drops, candy-pieces, or any other small article of substantially regular shape. With relation to the broad functions of article delivery or carton filling mechanism, we do not, in this application, limit ourselves to the specific mechanism shown in the drawings and hereafter briefly described, since various other specific forms of such mechanism may be provided in connection with the machine, which are especially adapted to serve with various kinds of articles or products, desired to be enclosed in a lined and sealed carton of the type which this machine is adapted to manipulate.

Briefly the filling mechanism shown consists in an annular hopper 185 suitably supported above said platform 7, and provided in its stationary bottom 186 with a discharge opening 187, beneath which is supported a chute 188, at the outer end of which is located a vertically movable funnel or spout 189 for operative engagement in the open end of a carton which is disposed on the carton runway 168 in position to be filled. Mounted within said hopper 185, for rotation above the stationary bottom 186 thereof, is a combined counting and conveyor plate 190. Said counting and conveyor plate 190 is fixed upon a downwardly extending spindle 191, by which it is rotated, preferably in an intermittent or step by step manner. The means for intermittently rotating said spindle 191, and through it the counting and conveyor plate 190, comprises a lay shaft 192 supported in bearings above said bed and parallel to said transmission shaft 9. The spindle 191 and shaft 192 are operatively related by means of intermeshing bevel gears 193. Arranged on the outer end of said shaft 192 is a pawl and ratchet mechanism 194, which is actuated, through the medium of a connecting rod 195, by means of a crank member 196 fixed on and driven by said transmission shaft 9.

The counting and conveyor plate 190 is provided with a series of radial groups of perforations or pockets 197, each group consisting of a desired predetermined number of such perforations or pockets. Said perforations or pockets are sized and shaped to correspond to and receive an article to be delivered into the carton. As the groups of perforations or pockets 197 are passed over the discharge opening 187 of the stationary bottom of the hopper by the intermittent rotation of the counting and conveyor plate, the articles contained therein will fall into the chute 188, and will thence pass through the funnel or spout 189 into the waiting carton alined beneath the latter. That section of the counting and conveyor plate, which in the rotation thereof approaches and alines a group of perforations or pockets 197 above the discharge opening 187 of the stationary bottom of the hopper, is partitioned off from the remaining portion of the same by a partition 198, and by a rotary back-sweeping brush 199. A mass of the articles to be counted, conveyed and finally discharged into the cartons, is deposited in the hopper on the exterior side of said partition 198. As the counting and conveyor plate rotates, the articles will fall into the perforations or pockets 197, and will be carried around toward the back-sweeping brush 199. In order to assure the filling of all the perforations or pockets 197 in each group thereof, a means for gently agitating the articles upon the surface of the counting and conveying plate is provided. This agitating means consists of a plurality of radially disposed oscillatory brushes 200, the spindle 201 of each being journaled in a bearing 203 fixed to the side walls of the hopper. The outer ends of the spindles 201 are provided with crank-arms 204 interconnected one with another by links 205. One of said spindles possesses an additional crank-arm 206, which, through interconnecting links and levers 207, is actuated by a vertically reciprocatory member 208, operative movements of which are produced by a race cam 209 mounted on said shaft 9, and all whereby the required operative rocking movement is transmitted to one spindle and thence to the others. As an article filled group or pockets approaches and passes beneath the back-sweeping brush 199, any excess of articles, beyond those properly lodged in the pockets, will be swept back and prevented from passing beyond the brush 199 toward the discharge opening 187 of the hopper, and consequently the count of the articles for delivery into the cartons is accurately attained. Said back-sweeping brush 199 is rotated by a belt and pulley drive 210 from a spindle 211 mounted in a bearing 212 supported on said bed 5, and said spindle 211 is in turn driven from said shaft 9 by a sprocket and chain or other suitable driving means 213.

Initially the funnel or spout 189 occupies a raised position, so that an open lined carton fed forward upon the runway 168 may be moved into vertically alined position beneath the same. When the carton arrives in such position, and prior to the discharge of goods from the hopper into the chute 188, and thence into the funnel or spout 189, the latter is moved downwardly so that laterally spaced lugs 189', which project downwardly from the lower end thereof will be entered into the open end of said lined carton, thus holding the carton against displacement from alined relation to the funnel or spout while the goods are passing through the latter into the interior of the lined carton. The means for vertically reciprocating the funnel or spout in timed relation to the carton movements and discharge of the articles from the hopper comprises a vertically reciprocable jack-rod 214, provided at its upper end with a bracket arm 215 on which said funnel or spout is supported. Pivotally supported on a fulcrum block 216 fixed on said bed 5 is a lever 217, one end of which is pivotally connected with said jack-rod 214, and the other end of which is actuated, to produce properly timed movements thereof, by a race cam 218 mounted on said transverse shaft 13.

In connection with the article delivery hopper, a means is provided for automatically closing the hopper discharge opening 187, against the further passage of articles therethrough, immediately after the last carton passed to article receiving position is filled. This means is illustrated in detail in Figures 24, 25 and 26 of the drawings, and comprises a pair of doors 219 hinged to said stationary bottom of the hopper to cooperate with said discharge opening 187. Said doors 219 are respectively connected by links 220 with the respective ends of a lift-bar 221, to which is pivotally connected, so as to depend therefrom, a push-rod 222. Extending upwardly through said platform 7 is a vertically reciprocable jack-rod 223, having at its upper end a receiving socket 224 to engage the lower free end of said push-rod 222, said socket 224 having rearwardly extending keeper wings 225 on each side to straddle said lower free end of said push-rod 222, which is pulled toward said jack-rod by a suitably anchored pull-spring 222'. Pivotally supported on a fulcrum block 226 fixed on said bed 5 is a lever 227, one end of which is pivotally connected with said jack-rod 223, and the other end of which is actuated, to produce operative vertical reciprocatory movement of said jack-rod 223, by a race cam 228 mounted on said transverse shaft 13.

Pivotally connected with the under side of the stationary bottom of said hopper, so as to depend therefrom in a suitable location, is a keeper-rod 229 having a forwardly projecting stop-nosing 230, which cooperates with said lift-bar 221, a suitably anchored pull spring 231 being provided for holding said keeper-rod 229 and its stop nosing 230 in cooperative relation to said lift-bar 221. Said keeper-rod 229 is also provided with a forwardly projecting handle-member 232 for manually releasing the same from holding engagement with said lift-bar 221. Initially the lift-bar 221 is raised to swing the doors 219 upwardly to closed position, and is held in such raised condition by the engagement of the stop-nosing 230 of the keeper-rod 229 beneath said lift-bar. When in such position the push-rod 222 is axially alined with the jack-rod 223.

Pivotally supported upon a fulcrum post 233 in the rear of the guard plate 184 of the carton runway 168 is a release pawl 234, the free end of which possesses a nosing 235, which projects through an opening 236 in said guard plate 184 so as to lie in the path of cartons moving forwardly to filling position. Slidably supported on a carrying post 237 is a trip-plate 238, the forward end of which is pivotally coupled with the free end of said release pawl 234. A pull spring 239 interconnected between said trip-plate 238 and the post 233, yieldably holds said trip-plate 238 and release pawl 234 in forwardly projected position. Said push-rod 222 is provided with an off-set arm 240, and said trip-plate 238 is provided with an extension 241 engageable with said arm 240.

When the machine is started and the first lined carton reaches filling position, the cartons as they pass through the runway 168 will engage the nosing 235 and press rearward the release pawl 234, whereby the trip-plate 238 is pressed rearwardly so that its extension 241 pushes or swings back the arm 240 of the push-rod 222, thus swinging the lower free end of the latter off of the socket 224 of the jack-rod 223, and out of axial alinement with the latter. The first carton being in filling position the operator, by means of the handle member 232, swings rearwardly the keeper-rod 229, thus releasing the stop-nosing 230 from the lift-bar 221. Since the push-rod 222 is removed from axial aline- ment with the jack-rod 223, the lift-bar 221 will drop by gravity and thus swing open the doors 219 to the passage of articles through the hopper discharge opening 187 and thence through the chute 188 and funnel 189 into the awaiting carton. So long as cartons are passing through the runway 168 to filling position, the parts will maintain the positions to which they have been moved as above described, and the reciprocation of the jack-rod 223 will not be transmitted to the push-rod 222, and consequently the doors 219 will remain open to the outward and downward passage of articles from the hopper. When, however, the last carton has passed the release-pawl and moved to filling position, and has received its allotment of articles, the runway 168 being empty of cartons, the release-pawl 234 and trip-plate 238 are no longer held pressed rearward, but return to normal initial position under the pull of the spring 239. The extension 241 of the trip-plate 238 no longer engages the arm 240 to hold the push-rod 222 out of alinement with the jack-rod 223, and consequently the former is swung forward into line with the latter, when the latter reaches the bottom of its stroke, so that upon the next upstroke thereof the push-rod 222 is lifted, to in turn raise said lift-bar 221 and thereupon swing upwardly to closed position the doors 219. When the lift-bar 221 reaches its raised position, the keeper-rod 229 will be swung forward by the spring 231, to reinsert the stop-nosing 230 beneath the lift-bar 221, to thereby retain the same in raised position and the doors 219 closed, until a repetition of the above described operations follows the resumption of carton movements through the runway 168.

*The means for sealing the open end of the carton lining, and closing the side tabs and closure flap at the remaining open end of the carton.*

After the carton has received its quota of articles it is pushed on by the succeeding cartons through the runway 168 to the discharge end thereof.

Supported upon a base-plate 241, which extends transversely outward from the forward side of said platform 7, is a carton discharge runway 242, the receiving end of which makes juncture with the discharge end of said carton runway 168. Cooperating with the receiving end of said carton discharge runway 242 is a reciprocable plunger 243 slidably mounted in a guide-block 243' supported upon the platform 7. The means producing timed reciprocations of said plunger 243, comprises a lever 244 which is fulcrumed on the end of the platform 7, the upper end of which is pivotally connected to a lateral lug 245 which projects from the side of said plunger. Said lever 244 is actuated by a race cam 246, mounted on said transmission shaft 8, which operates a connecting rod 247 the outer end of which is pivotally connected with the lower end of said lever 244. The receiving end of said carton discharge runway 242, where the same makes juncture with the discharge end of the carton runway 168, is formed to provide a depressed level 248 in a plane below the normal level of both the runway 242 and the runway 168. Said depressed level 248 is joined to the normal level of said runway 242 by an upwardly extending incline 249. In the depressed level 248 and its incline 249 is a central way or channel, the bottom surface of which possesses an upward incline 250 corresponding to the incline 249. Pivotally connected with said plunger is a lift tongue 251, which rides in said way or channel and over the incline 250, when said plunger is reciprocated.

While the plunger 243 is in retracted position, the forward feeding movement of the cartons through the runway 168 pushes the foremost filled carton out of the discharge end of the latter runway, so that the same drops down upon the depressed level 248 of the runway 242. This slight end-wise drop of the filled carton upon its initially closed end, tends to firmly thrust home the end closure flap and tuck portion of said initially closed end, and also settles the content of the carton within the interior thereof. After a filled carton has thus been delivered into the receiving end of the runway 242, the plunger 243 is timed to move forward, thereby pushing the filled carton into a position wherein it is operatively alined with the mechanism for sealing the open end of the lining and closing the side tabs and closure flap at the remaining open end thereof. As the plunger 243 thus moves forward the carton to final end closing position, the lift tongue 251, as it moves forward with the plunger, is caused to ride upwardly on the incline 250, which swings upward the lift-tongue and exerts a lifting pressure upon the bottom end of the carton which raises the same to the normal level of the runway 242, without strain or likelihood of obstruction.

The means for closing and sealing the open end of the lining and also closing the side tabs and end closure flap at the remaining open end of the carton comprises, a supporting plate 252 which is secured upon posts or uprights 253, so as to elevate the same above the receiving end of the runway 242. Journaled in bearings 254, which are fixed on said supporting plate 252, is a shaft 255 disposed transversely of said supporting plate. Fixed on said shaft 255 is a rotatable member 256 from which projects a plurality of tucker fingers, preferably comprising a central tucker finger 257 and a pair of rearwardly off-set side tucker fingers 258. Also projecting from said rotatable member 256, in a diametrically opposite direction, is a retaining finger 259 provided with a concave face 260 adjacent to its free end. The means for rotating said shaft and the rotatable member with its associated parts comprises, a sprocket and chain drive 261 operated by said transmission shaft 8 and intergeared by the gears 262 with said shaft 255. The supporting plate 252 possesses an opening through which the rotatable member 256 and associated parts move to cooperate with a carton operatively positioned in the runway 242 beneath.

Secured to the underside of said supporting plate 252 are guide blocks 263, in which are arranged, for reciprocable movement transversely of the carton operatively positioned in the runway 242 beneath, a pair of opposed folder members 264. Each folder member 264 is heated at its forward operative end by means of an electrical heating element 265, which is imbedded in the body thereof. The means for producing the properly timed reciprocatory movements of said folder members 264 comprises a pair of bell-crank levers 266 fulcrumed on said base-plate 241, their upwardly extending arms being respectively pivotally interconnected by links 267 to the depending knuckles 268 of the respective folder members 264. Pivotally mounted beneath said base-plate 241 is an oscillatable lever 269, one arm of which is pivotally interconnected with the lower arm of one bell-crank lever through a link 270, and the other arm of which is pivotally interconnected with the lower arm of the other bell-crank, in like manner, by means of a link 271. The oscillations of the lever 269 rocks the bell-crank levers 266 in opposite directions, whereby the folder members 264 are caused to simultaneously move inwardly and outwardly to perform their functions. The means for producing the timed oscillations of said lever 269, to in turn produce the properly timed reciprocable movements of said folder members 264, comprises a race-cam 272 which actuates a vertical connecting-rod 273, the upper free end of which is pivotally connected with said lever 269.

Supported from the supporting plate 252, by means of a bracket member 274, is a downwardly and forwardly inclined guide plate 275, upon which is slidably mounted a folding and tucking plate 276. The free forward end of said folding and tucking plate 276 is provided with a folder foot 277 provided with a substantially horizontal pressing face 278. The means for reciprocating said folding and tucking plate 276, comprises a rocking lever 279 which is pivoted to a fulcrum support 280 fixed on said supporting plate 252. The upper free end of said rocking lever 279 is pivotally interconnected by a link 281 to a coupling knuckle 282 which depends from the rearward end of said folding and tucking plate 276. The means for producing properly timed reciprocable movements of said folding and tucking plate comprises a race cam 283 mounted on said transmission shaft 9 and adapted to oscillate a lever 284 fulcrumed on said bed 5. The upper free end of said lever 284 is pivotally interconnected with said rocking lever 279 by means of a connecting rod 285.

In operation, after the filled carton is delivered into the discharge runway 242, and pushed by the plunger 243 into operative alinement with the lining closing and sealing and carton end closing mechanism above described, a timed rotation of the member 256 (which rotates in the direction indicated by the arrow in Figure 18) first carries the central tucker finger 257 rearwardly against the outer marginal end portion of the wax paper lining, which projects from the open end of the carton, and tucks the same inward, the side tucking fingers 258 following and continuing the inwardly tucking effect, whereby said outer marginal end portion is tucked back against the rearward marginal end portion of said lining (see Figures 19 and 21). By the time said tucker fingers have completed such rearwardly tucking operation, the actuating mechanism of the folder members 264 initiates the forward operative movement of the latter. As the folder members 264 move inwardly, their forward ends engage and fold downwardly and inwardly the upstanding side tabs 2, and at the same time fold downwardly and inwardly the side portions of the lining with said side tabs, but leaving certain portions of the lining folded upon themselves over the registered forward and rear portions of the lining, so that the latter portions of the lining, thus interfolded together, project upwardly against the rear faces of the folder members 264, and intermediate the latter and said upstanding end closure flap 3 of the carton end (see Figure 20). The actuating means for the folder members 264 operates to effect a dwell of the same in their inwardly moved operative positions. Since the folder members 264 are heated, the generated heat will soften or fuse the wax of the lining paper, while the folder members 264 dwell in forward operative position, whereby the interfolded and closed portions of the lining are caused to fuse and adhere together, thus finally and completely hermetically sealing the lining in which the goods or articles contained in the carton are immediately enclosed.

While the folder members 264 are thus dwelling in forward operative positions, the actuating mechanism for the folding and tucking plate 276 initiates the downward and forward movement thereof, which carries the pressing face 278 of the folder foot 277 against the free edge of the tuck-portion 4 of the end closure flap 3 of the carton, whereby the said tuck-portion is bent forwardly and downwardly across the top sides of said folder members 264 (see Figures 20 and 22). The actuating mechanism for the folding and tucking plate 276 now operates to effect a momentary dwell of the latter, to give time for the retraction of the folder members 264, which immediately begins upon the completion of the initial downward movement of said tuck-portion 4. As soon as the folder members 264 are completely withdrawn toward initial position, the tucking and folding plate 276 resumes its downward movement. In the meantime the rotation of the member 256 has carried around and operatively presented the retaining finger 259, so that as the tucking and folding plate 276 swings downward the end closure flap 3 of the carton, the tuck-portion 4 thereof will be caught by the concave face 260 of said retaining finger, and retained thereby in the desired angularly bent relation to the end closure flap 3, with its free end directed toward the open end of the carton body and guided by the concave face 260 to enter such open end, as the continued downward movement of the tucking and folding plate 276 folds down and thrusts home the end-closure flap 3 and said tuck-portion 4 to completely closed position relative to the remaining open end of the carton (see Figure 23). The folding and tucking plate 276 is suitably slotted to permit the clearance of the tucking fingers 257 and 258, and also of the retaining finger 259.

The carton having thus been completely closed and its lining hermetically sealed, is displaced and pushed onward and outward through the discharge runway 242 by the arrival of a succeeding filled carton in position to have its remaining open end closed. The filled and closed cartons will therefore form an outwardly moving train through said discharge runway during the continued operation of the machine, the filled and closed cartons being finally removed from the discharge runway ready to be packed for shipment.

From the above description of the construction, arrangement and operation of the various groups of devices and their parts, the functioning of the machine as a whole will be clearly understood without necessity for further recapitulation except to say, that the operations are successively carried out in a continuous manner, the various groups of devices or mechanisms being synchronized for proper correlation as will be clearly evident.

Having thus described our invention, we claim:—

1. In a machine of the kind described, a slideway in horizontal plane, means to supply collapsed cartons at one end of said slideway, means to square said collapsed cartons and means to close one end thereof, means to intermittently and progressively move the thus set-up cartons flatwise on said slideway, and means at one side of said slideway to pre-form linings and insert the same within said cartons while supported on said slideway.

2. In a machine of the kind described, a slideway in horizontal plane, means to supply collapsed cartons at one end of said slideway, means to square said collapsed cartons and means to close one end thereof, means to intermittently and progressively move the thus set-up cartons flatwise on said slide-way, means at one side of said slideway to pre-form linings and insert the same within said cartons while supported on said slideway, a carton runway having its receiving end adjacent to the discharge end of said slideway, an oscillatable fly-plate at the discharge end of said slideway to successively receive and up-turn lined cartons into the receiving end of said runway, means to intermittently and progressively move said lined cartons through said runway, and means to fill said cartons while in said runway.

3. In a machine of the kind described, a slideway in horizontal plane, means to supply collapsed cartons at one end of said slideway, means to square said collapsed cartons and means to close one end thereof, means to intermittently and progressively move the thus set-up cartons flatwise on said slideway, means at one side of said slideway to pre-form linings and insert the same within said cartons while supported on said slideway, a carton runway having its receiving end adjacent to the discharge end of said slideway, an oscillatable fly-plate at the discharge end of said slideway to successively receive and up-turn lined cartons into the receiving end of said runway, means to intermittently and progressively move said lined cartons through said runway, means to fill said cartons while in said runway, and means adjacent to the discharge end of said runway to close the open-ends of said lined and filled cartons.

4. In a carton filling and closing machine, a slideway in horizontal plane, means to supply collapsed cartons at one end of said slideway, means to square said collapsed cartons and means to close one end thereof, means to intermittently and progressively move the thus set-up cartons flatwise on said slideway, a carton runway having its receiving end adjacent to the discharge end of said slideway, an oscillatable fly-plate at the discharge end of said slideway to successively receive and up-turn the set-up cartons on to their closed ends within the receiving end of said runway, means to intermittently and progressively move said cartons through said runway, and means to fill said cartons while in said runway.

5. In a carton filling and closing machine, a slideway in horizontal plane, means to supply collapsed cartons at one end of said slideway, means to square said collapsed cartons and means to close one end thereof, means to intermittently and progressively move the thus set-up cartons flatwise on said slideway, a carton runway having its receiving end adjacent to the discharge end of said slideway, an oscillatable fly-plate at the discharge end of said slideway to successively receive and up-turn the set-up cartons on to their closed ends within the receiving end of said runway, means to intermittently and progressively move said cartons through said runway, means to fill said cartons while in said runway, and means adjacent to the discharge end of said runway to close the open ends of said filled cartons.

6. In a machine of the kind described, a slideway in horizontal plane, means to supply collapsed cartons at one end of said slideway, means to square said collapsed cartons and means to close one end thereof, a reciprocable carton propelling means cooperative with said slideway to propel the thus set-up cartons in an intermittently moving train along said slideway, means at one side of said slideway to pre-form linings and insert the same within said cartons while at rest on said slideway, and means at the opposite side of said slideway to hold the cartons against displacement during the lining inserting operation.

7. In a machine of the kind described, a slideway in horizontal plane, means to supply collapsed cartons at one end of said slideway, means to square said collapsed cartons and means to close one end thereof, a reciprocable carton propelling means cooperative with said slideway to propel the thus set-up cartons in an intermittently moving train along said slideway, means at one side of said slideway to pre-form linings and insert the same within said cartons while at rest on said slideway, means at the opposite side of said slideway to hold the cartons against displacement during the lining inserting operation, a carton runway having its receiving end adjacent to the discharge end of said slideway, an oscillatable fly-plate at the discharge end of said slideway to successively receive and upturn lined cartons into the receiving end of said runway, means to intermittently and progressively move said lined cartons through said runway, and means to fill said cartons while in said runway.

8. In a machine of the kind described, a slideway in horizontal plane, means to supply collapsed cartons at one end of said slideway, means to square said collapsed cartons and means to close one end thereof, a reciprocable carton propelling means cooperative with said slideway to propel the thus set-up cartons in an intermittently moving train along said slideway, means at one side of said slideway to pre-form linings and insert the same within said cartons while at rest on said slideway, means at the opposite side of said slideway to hold the cartons against displacement during the lining inserting operation, a carton runway having its receiving end adjacent to the discharge end of said slideway, an oscillatable fly-plate at the discharge end of said slideway to successively receive and upturn lined cartons into the receiving end of said runway, means to intermittently and progressively move said lined cartons through said runway, means to fill said cartons while in said runway, and means adjacent to the discharge end of said runway to close the open ends of said lined and filled cartons.

9. In a machine of the kind described having means to set up collapsed cartons and means to close one end thereof, a rotatable article delivery means adapted by its rotation to aggregate articles from bulk into groups of predetermined number, a chute cooperating with said article delivery means into which the groups of articles are successively discharged, a carton runway, means for intermittently and progressively moving cartons through said runway with their open ends upturned and into registration with the discharge end of said chute to receive the articles discharged through the latter, closing means for interrupting communication between said article delivery means and chute, means to actuate said closing means, and means operated by the movement of cartons in said runway to hold said actuating means inoperative so long as cartons are moving through said runway to said chute.

10. In a machine of the kind described, means for supporting a squared carton with its opposite ends open, and means for closing the side tabs and closure flap and tucking the tuck portion of the latter at one end of the squared carton, comprising a pair of opposed pivoted folder members having inwardly directed folder fingers at their free ends, the outer sides of said folder fingers being inwardly and downwardly chamfered to provide anguler anvil portions, actuating means for said folder members, said actuating means operating to initially turn said folder members toward each other to cause their folder fingers to respectively engage and turn to closed position the carton side tabs presented in the path of their movement, a downwardly and inwardly inclined reciprocable folding and tucking device having a presser face substantially parallel to the end plane of the carton and bending portions extending forwardly from said presser face, actuating means for said folding and tucking device operating to move the same inward to cause said bending portions to first engage said tuck portion of the carton closure flap and bend the same downwardly around said anvil portions of said folder members prior to the retraction of the latter, and then subsequent to the retraction of said folder members to cause said presser face to turn said carton closure flap to closed position and simultaneously tuck the tuck-portion thereof into the end of the carton body.

11. In a machine of the kind described, means for supporting a squared carton with its opposite ends open, and means for closing the side tabs and closure flap and tucking the tuck portion of the latter at one end of the squared carton, comprising a pair of opposed pivoted folder members having inwardly directed folder fingers at their free ends, the outer sides of said folder fingers being inwardly and downwardly chamfered to provide angular anvil portions, actuating means for said folder members, said actuating means operating to initially turn said folder members toward each other to cause their folder fingers to respectively engage and turn to closed position the carton side tabs presented in the path of their movement, a downwardly and inwardly inclined reciprocable folding and tucking device having a presser face substantially parallel to the end plane of the carton and bending portions extending forwardly from said presser face, actuating means for said folding and tucking device operating to move the same inward to cause said bending portions to first engage said tuck portion of the carton closure flap and bend the same downwardly around said anvil portions of said folder members prior to the retraction of the latter, and then subsequent to the retraction of said folder members to cause said presser face to turn said carton closure flap to closed position and simultaneously tuck the tuck-portion thereof into the end of the carton body, and a stop means to engage the bottom edge of the carton body to locate the latter relative to the foresaid closing means and retain the same against longitudinal displacement from said supporting means, said stop means also serving to guide the free end of said tuck-portion into said end of the carton body.

12. In a machine of the kind described, means for closing the side tabs and the closure flap and tucking the tuck portion of the latter at the open end of a filled carton, comprising transversely movable opposed folder devices, actuating means operating to initially move said folder devices toward each other to cause the same to respectively engage and turn to closed position the carton side tabs presented to the path of their movement, a downwardly inclined reciprocable folding and tucking device opposed to the carton end, actuating means for said folding and tucking device operating to move the same toward the carton to engage said tuck portion of the carton closure flap and bend the same downwardly over the inwardly moved side tab folder devices prior to the retraction of the latter, and then subsequent to the retraction of said folder devices to turn said carton closure flap to closed position, and means cooperating with said folding and tucking device movable in an opposite direction toward said carton end to engage said bent tuck portion and guide the same into the open end of the carton as the closure flap is moved to closed position.

13. In a machine of the kind described, means for closing and sealing the open end of a filled lined carton, comprising transversely movable opposed folder devices, means for heating said folder devices, a rotary means having tucking fingers the movement of which is timed to close the mouth of the open lining in advance of the operative movement of said folder devices whereby upon such movement of the latter the closed mouth of said lining is interfolded and sealed by the heat of said folder devices simultaneously with the down turning thereby of the side tabs of the carton closure, a downwardly inclined reciprocable folding and tucking device opposed to the carton end, and movable toward the latter to turn downwardly across the open end of the carton the closure flap thereof, and a guide finger connected with said rotary means the movement of which is timed to engage and guide the free end of said tuck portion of said closure flap into the open end of the carton as said flap moved to closed position.

14. In a machine of the kind described, means for closing and sealing the open end of a filled lined carton, comprising transversely movable opposed folder devices, means for heating said folder devices, a rotary means having tucking fingers the movement of which is timed to close the mouth of the open lining in advance of the operative movement of said folder devices whereby upon such movement of the latter the closed mouth of said lining is interfolded and sealed by the heat of said folder devices simultaneously with the down turning thereby of the side tabs of the carton closure, a downwardly inclined reciprocable folding and tucking device opposed to the carton end, actuating means for said folding and tucking device operating to move the same toward the carton to initially engage the tuck portion of the end flap of the carton closure and bend the same downwardly over the inwardly moved side tab folder devices prior to the retraction of the latter, and then subsequent to the retraction of said folder devices to turn said end flap to closed position, and a guide finger connected with said rotary means the movement of which is timed to engage and guide the free end of said tuck portion into the open end of the carton as said flap is moved to closed position.

In testimony, that we claim the invention set forth above we have hereunto set our hand this 2nd day of July 1924.

HARRY L. EVANS.
GEORGE I. HOHL.